(12) United States Patent
Li et al.

(10) Patent No.: US 7,692,904 B2
(45) Date of Patent: Apr. 6, 2010

(54) GROUND FAULT CIRCUIT INTERRUPTER

(76) Inventors: Xuguang Li, Longping Eastern Road, Yantian Village, Fenggang Town, Dongguan City, Guangdong Province (CN); Xiaobing Dong, Longping Eastern Road, Yantian Village, Fenggang Town, Dongguan City, Guangdong Province (CN); Yi Yin, Longping Eastern Road, Yantian Village, Fenggang Town, Dongguan City, Guangdong Province (CN)

( * ) Notice: Subject to any disclaimer, the term of this patent is extended or adjusted under 35 U.S.C. 154(b) by 167 days.

(21) Appl. No.: 11/901,759

(22) Filed: Sep. 18, 2007

(65) Prior Publication Data

US 2008/0225448 A1    Sep. 18, 2008

(51) Int. Cl.
*H02H 3/00* (2006.01)
(52) U.S. Cl. .......................................... 361/45; 361/42
(58) Field of Classification Search .............. 361/42–50, 361/71–74
See application file for complete search history.

(56) References Cited

U.S. PATENT DOCUMENTS 6,370,001 B1 * 4/2002 Macbeth ..................... 361/170
6,980,005 B2 * 12/2005 Finlay et al. ................ 324/424

* cited by examiner

*Primary Examiner*—Danny Nguyen
(74) *Attorney, Agent, or Firm*—Raymond Y. Chan; David and Raymond Patent Firm (57) ABSTRACT

A method of preventing an overload current from a power supply to a load through a ground fault circuit interrupter includes the steps of: obtaining an interrupted fault current from a hot wire to a ground wire via a first zero-phase current inductor and a fault current from a neutral wire to the ground wire via a second zero-phase current inductor; amplifying a signal of the fault current by an Op-Amp; and determining the fault current by a programmable control module, wherein when the fault current is larger than a preset threshold, the programmable control module sends a control signal to a control switch such that the control switch electrifies a second coil of a trip breaker to drive an armature at an unlocked position, so as to separate a movable terminal with a fixed terminal for electrically disconnecting the load with the power supply.

16 Claims, 8 Drawing Sheets

GROUND FAULT CIRCUIT INTERRUPTER

BACKGROUND OF THE PRESENT INVENTION

1. Field of Invention

The present invention relates to a ground fault circuit interrupter, and more particularly to an always-open trip breaker used in a ground fault circuit interrupter with a programmable integrated module and an End-of-life termination function.

2. Description of Related Arts

When the hot wire or neutral wire is short circuited to the ground, the ground fault circuit interrupter is used as an electrical switch not only for protecting the electrical circuit of the electrical appliance from being damaged caused by overload or short circuiting but also for preventing the user from being electric shocked. The ground fault circuit interrupter has a higher sensitivity and faster response in comparison with other protection devices, such as fuse or automatic switch. The ground fault circuit interrupter can rapidly cut off the current and prevent current overload.

Accordingly, the automatic switch or the fuse has an operation value corresponding to the normal operation current in order to withstand the operation current passing through. Once the fault current is larger than the operation value, the automatic switch or the fuse will cut off the electrical connection between the load and the power supply. On the other hand, the leakage protector use the residual current produced in the ground fault to cut off the power supply. Therefore, the operation value of the leakage protector is relatively small (generally set as 6 milliampere). However, when the current is leaked by human contact or to the outer casing, the residual current will substantially increase. It is worth mentioning that the ground fault circuit interrupter can determine and stop the residual current so as to cut off the current from the power supply.

Generally speaking, the ground fault circuit interrupter comprises a trigging mechanism to rapidly cut off the current to the electrical appliance, wherein there are two different types of tripping mechanisms being commonly used. The first type is the "always-close" type tripping mechanism electrically connecting to the movable terminal and the fixed terminal for electrical connection. The mechanical pressure between the movable terminal and the fixed terminal relies on the trip breaker of the tripping mechanism implemented using a solenoid or electromagnet force. The advantage of such "always-close" tripping mechanism is that the operation is reliable, the circuit and the mechanism is simple. However, the drawback of such "always-close" type tripping mechanism is that the coil of the trip breaker consumes part of the electrical power. Another type is the "always-open" type tripping mechanism relying on an impulsive current to the coil of the trip breaker such that the trip breaker shifts at an off-balance state by means of the electromagnetic force to electrically connect with the movable terminal and the fixed terminal. Accordingly, a locker is incorporated with the trip breaker to provide a mechanical pressure between the movable terminal and the fixed terminal. Such "always-open" tripping mechanism requires the locker and a logic circuit to incorporate with the trip breaker, such that the "always-open" tripping mechanism has relatively complicated electrical and mechanical configurations. However, the "always-open" tripping mechanism does not require any current passing through the coil thereof for operation. In other words, the "always-open" tripping mechanism does not normally consume any electrical power. Comparing with the two different types of tripping mechanisms, the "always-close" tripping mechanism is commonly used for the simple IC circuit product because the "always-close" tripping mechanism has simplified electrical and mechanical configurations.

The ground fault circuit interrupter generally comprises a fault current induction mechanism, including a sensor coil and a driver coil, a signal rectifying circuit, a signal amplifying circuit, a signal comparing circuit, a threshold switch circuit, an operation mechanism, and other peripheral circuits. Accordingly, a signal induction mechanism comprises two zero-phase current inductors, wherein one of the current inductors has a coil ratio of primary and secondary windings being set as 1:1000 while another current inductor has a coil ratio of primary and secondary windings being set as 1:200. The signal rectifying circuit is coupled with capacitors and resistors to form a signal extraction circuit, wherein the signal amplifying circuit and the signal comparing circuit are combined to form a semiconductor chip such as LM1851 chip from National and RV4145A chip from Fairchild. The threshold switch circuit comprises a silicon controlled rectifier (SCR). The operation mechanism comprises a trip breaker and its corresponding components thereof, and peripheral circuit and components comprising a movable terminal, a fixed terminal, a test button, and a reset button. Before the standard of UL943-2006 is set, the function of the ground fault circuit interrupter is that: (1) when the hot wire and neutral wire is faulty to the ground, and the fault current is bigger than 6 mA, the power supply is cut off; (2) when there is no fault current or the fault current is not larger than the threshold, the ground fault circuit interrupter can be reset by the reset button to re-connect the ground fault circuit interrupter with the power supply; (3) the test button is used for testing the function of the ground fault circuit interrupter by pressing the test button to cut off the power supply; (4) when the wires at the load and the power supply are reversely connected, the ground fault circuit interrupter cannot be electrified so as to protect the load in responsive to the improper connection.

According to the standard before UL943-2006, the ground fault circuit interrupter does not have the End-of-life automatic self-checking function. The user manually presses the test button to check whether the ground fault circuit interrupter is faulty or failed. The trip breaker must be operated with the constant power supply, which will shorten the service life of the trip breaker. Thus, there is no indicating signal, such as sound signal or light signal, to indicate the operating status of the trip breaker.

Along with the programmable integrated module application, it is possible to incorporate the programmable integrated module with the "always-open" tripping mechanism with the logical control.

The present invention provides a programmable integrated module and a control switch incorporating with the "always-open" tripping mechanism to cut off the current exceeding the breaker rating and to protect the wrong wiring connection of the circuit.

SUMMARY OF THE PRESENT INVENTION

A main object of the present invention is to provide a ground fault circuit interrupter that meets the requirement of the UL-943-2006, wherein the trip breaker is arranged to cut off the electric connection between the power supply and the load when the fault current is larger than the preset value. In addition, the trip breaker of the present invention also cuts off the electrical connection between the power supply and the load when the wires are misconnected or improperly connected. Thus, the trip breaker does not consume any power during normal operation.

Another main object of the present invention is to provide a ground fault circuit interrupter with a programmable integrated module, which is capable of performing an End-of-life automatic self-checking, that satisfies the UL943-2006. In addition, the ground fault circuit interrupter is adapted for indicating the working status of the ground fault circuit interrupter by twinkling frequency of the LED indicator. When the ground fault circuit interrupter is normally operated, the LED indicator generates a slow-twinkling light signal with the frequency of 0.1 Hz. When the ground fault circuit interrupter is abnormally operated, including the signal induction mechanism or the operation mechanism being malfunction, the LED indicator generates a fast-twinkling light signal with the frequency of 1 Hz to indicate the service life of the ground fault circuit interrupter is terminated.

Another object of the present invention is to provide a ground fault circuit interrupter, wherein when the wires at the load and the power supply (or power line) are reversely connected, the programmable integrated module and the control switch cannot be electrified, such that the trip breaker cannot be operated to re-connect the load with the power supply through the reset button.

Another object of the present invention is to provide a ground fault circuit interrupter, wherein when the hot wire and the neutral wire are misconnected, the programmable integrated module will perform the self-checking operation by pressing the reset button. When the driver coil obtains a fault current larger than 6 mA, through the electromagnetically coupling with the sensor coil, the programmable integrated module will obtain a current signal which is larger than 6 mA. Then, the programmable integrated module will send a trigger signal to the gate electrode of the SCR to electrify the coil of the trip breaker and drive the armature to move. Therefore, the locking device is driven to move by the armature to move the movable terminal away from the fixed terminal by means of resilient spring force so as to cut off the electrical connection between the load and the power supply. Accordingly, the trip breaker cannot be reset by the reset button to re-connect the load with the power supply unless the wires are electrically connected in a proper manner.

Another object of the present invention is to provide a ground fault circuit interrupter, wherein the two coils are kept in "always-open" condition by the programmable integrated module such that the trip breaker is controllably operated by the determination of the output terminal of the sensor coil. In other words, the trip breaker is actuated to cut off the electrical connection when the sensor coils inducts the fault current larger than 6 mA. Otherwise, the trip breaker is not being electrified during normal operation.

Accordingly, in order to accomplish the above object, the present invention provides a method of preventing an overload current through a ground fault circuit interrupter, comprising the steps of: obtaining an interrupted fault current from a hot wire to a ground wire via a first zero-phase current inductor and a fault current from a neutral wire to the ground wire via a second zero-phase current inductor; amplifying a signal of the fault current by an Op-Amp; and determining the fault current by a programmable control module, wherein when the fault current is larger than a preset threshold, the programmable control module sends a control signal to a control switch such that the control switch electrifies a second coil of the trip breaker to drive an armature at an unlocked position, so as to separate the movable terminal with the fixed terminal by a resilient spring force for electrically disconnecting the load with the power supply. At the same time, the programmable control module periodically sends out an adjustment signal to a terminal of the control switch in which the terminal thereof is connected between the neutral wire and the ground wire, so as to conduct the control switch periodically. Therefore, the programmable control module ensures a resistor between the neutral wire and the ground wire of the load being set at 1 ohm via hardware so as to satisfy the standard of the UL-943-2006. The driver coil is adapted to produce an instant short-circuit current, wherein an induced current signal is generated by electromagnetic coupling the driver coil with the sensor coil. Through the Op-Amp and the programmable control module, the fault current is determined in order to compare with the preset threshold. When the value of the fault current equals to the preset threshold, the programmable control module will sends a slow-twinkling signal to a LED as an End-of-life sign to indicate the system is normally operated. On the other hand, when the system is failed to operate, the programmable control module will send a fast-twinkling signal to the LED to perform the End-of-life of UL-943-2006 of the automatic self-checking function through the hardware and software. By obtaining the current and incorporating with the trip breaker, the electrical connection between the load and the power supply is cut off to provide a safety feature of the load and to prevent the user being electric shock. The programmable control module is the core of the system of the present invention, wherein the circuit configuration is simple and is in low cost, and satisfies the relevant requirement of UL-943-2006. The trip breaker, which has a simple structural configuration and a smaller size, comprises the control switch, operating coils, an armature, a supporting frame, and a contact. Thus, the trip breaker, which is the "always-open" type tripping mechanism", is adapted to reduce the power consumption of the working coils during operation so as to prolong the service life of the working coils.

Accordingly, the trip breaker comprises two coils, a programmable control module having gate levels of input/output ports connecting to the coils respectively to operate a connection between a movable terminal and a fixed terminal. To meet the requirements of UL-943-2006 and other relevant standards, the electrical connection and the load is cut off when the fault current is larger than the preset threshold and when the wires are misconnected or improperly connected. Since the two coils are always in an "always-open" condition, the coils do not consume any energy during the normal operation of the ground fault current interrupter.

The programmable control module of the present invention is adapted to cut off the fault current, including the hot wire ground fault and the neutral wire ground fault, when the fault current is larger than the preset threshold. Accordingly, the programmable integrated module, the control switch, and the trip breaker with the locking device form the "always-open" type tripping structure.

The present invention prohibits the re-connection between the load and the power supply even though the reset button of the system is actuated. When the wires are misconnected, the control switch, which is positioned between neutral wire and the ground wire for use in the End-of-life self checking operation, is electrically connected in parallel with a transient voltage suppressor to protect the control switch. At the same time, the driver coil will produce the induced current signal by electromagnetic coupling the driver coil with the sensor coil through the transient voltage suppressor to let the programmable control module for determination. By setting the gate level of the coil 1 of the trip breaker, which is electrically connected to the control switch, in a relatively high level, the second coil of the trip breaker is electrified to actuate the armature to operate the locking device. When the locking device is unlocked to separate the movable terminal from the fixed terminal, the electrical connection between the load and the power supply is cut off.

The present invention also prohibits the re-connection between the load and the power supply even though the reset button of the system is actuated. When the wires are improperly connected, such as the wires are connecting reversely, the circuit configuration of the present invention ensures the programmable integrated module and the control switch not being electrified.

The present invention also prohibits the re-connection between the load and the power supply even though the reset button of the system is actuated. When the wires are misconnected, the programmable integrated module logically determines the misconnection of the wires and sets the first coil of the trip breaker at a low electrical level to form an open circuit of the first coil. Therefore, the armature cannot be electrified to actuate for unlocking the locking device. Due to the spring force, the movable terminal and the fixed terminal cannot be contacted so as to prohibit the electrical connection.

DETAILED DESCRIPTION OF THE PREFERRED EMBODIMENT

Figure 1:
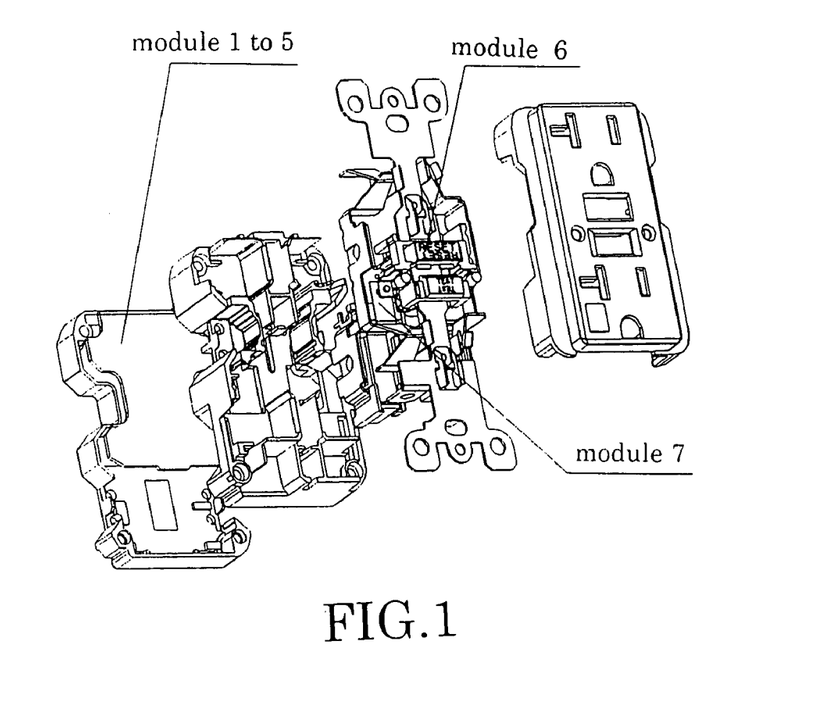
FIG. 1 is a perspective view of a ground fault circuit interrupter according to a preferred embodiment of the present invention.

Referring to FIG. 1 of the drawings, a ground fault circuit interrupter according to a preferred embodiment of the present invention is illustrated, wherein the ground fault circuit interrupter is constructed by seven functional modules. Accordingly, the ground fault circuit interrupter comprises a first module 1 as a power supply module, third and fourth modules 3, 4 being electrically coupling with the first module 1 that the first module 1 supplies a unipolar +5V power supply to the third and fourth modules 3, 4. A second module 2 as an induction sensor and a signal adjusting circuitry is arranged to obtain a ground fault current and an End-of-life self-checking current through a sensor coil and a driver coil. The third module 3 as a signal amplifying circuit amplifies a current from the second module 2 to the fourth module 4 for determining a working status of the ground fault circuit interrupter. The fourth module 4 as a programmable integrated module is arranged for determining the magnitude of the ground fault current, for determining an automatic End-of-life self-check, and for generating a trigger signal for further mechanical operation and the operation of LED indicator. Therefore, the fault current and the misconnected wires can be determined and the automatic End-of-life self-check can be performed. A fifth module 5 is a circuit of the automatic End-of-life self-check to periodically ground a preset neutral wire with a fixed resistor through the second module 2, the third module 3, the fourth module 4, and the LED indicator. A sixth module 6 is an operation unit of the fault circuit interrupter for moving the movable terminal 201 away from the fixed terminal 202 when the fault current exceeds the preset threshold, so as to cut off the electrical connection between the load and the power supply. Thus, the sixth module 6 prohibits the re-connection between the load and the power supply when the wires are misconnected or improperly connected even though the reset button 301 of the system is actuated. A seventh module 7 comprises a trip breaking mechanism and an accessory mechanism which comprises the movable terminal 201, the fixed terminal 202, the LED indicator for indicating the operating status of the ground fault circuit interrupter, the reset button 301, and a test button 302 for cooperating with other modules of the ground fault circuit interrupter.

Figure 2:
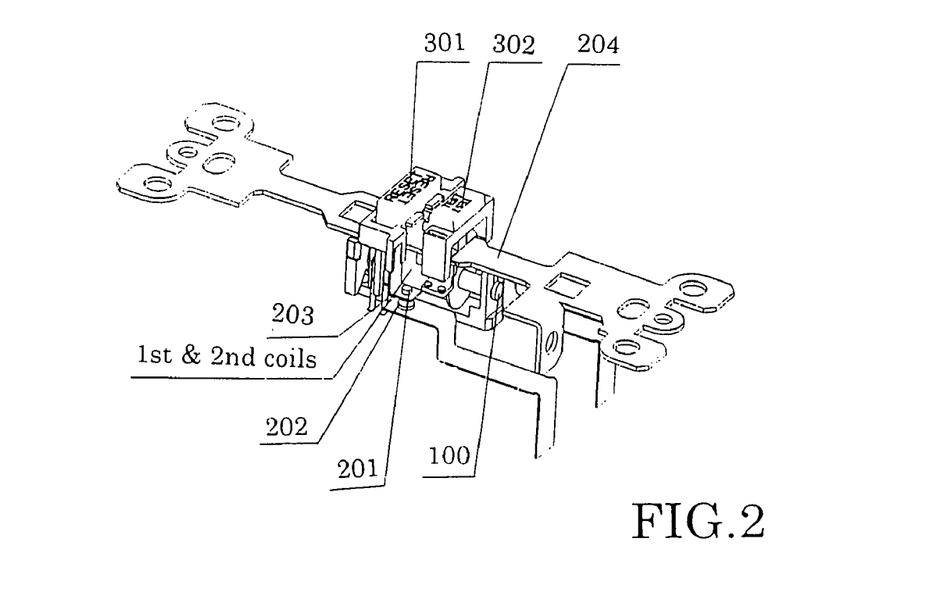
FIG. 2 is the schematic view of a trip breaker of the ground fault circuit interrupter according to the above preferred embodiment of the present invention.

As shown in FIG. 2, the ground fault circuit interrupter comprises two trip coils 1, 2, a supporting frame 204, a locking device 203, the movable terminal 201, the fixed terminal 202, an armature 100, the reset button 301, and the test button 302.

Figure 3A:
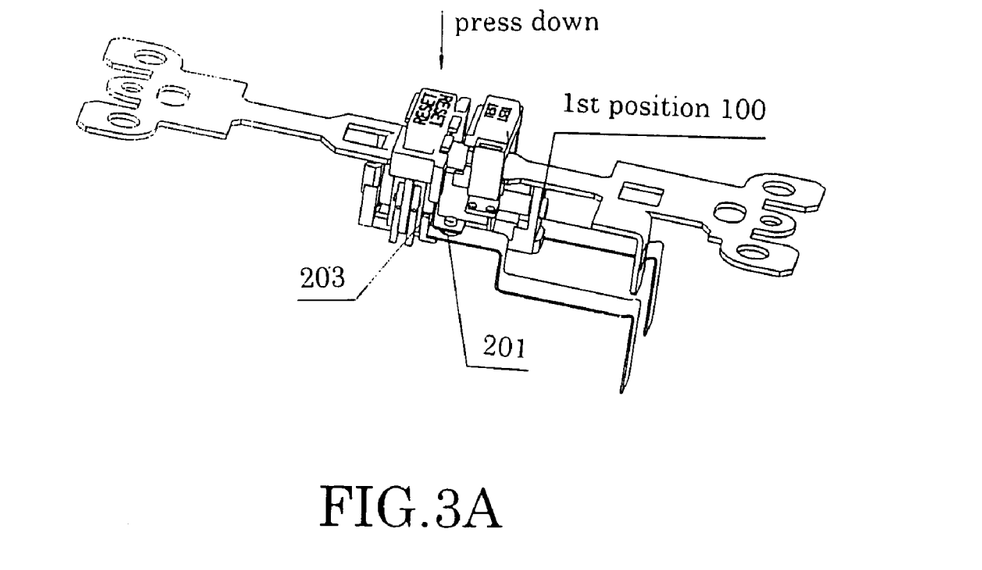
FIGS. 3A and 3B illustrate the trip breaker cutting off the electrical connection between the load and the power supply when hot wire is short to the ground and the fault current exceeds preset threshold.
Figure 3B:
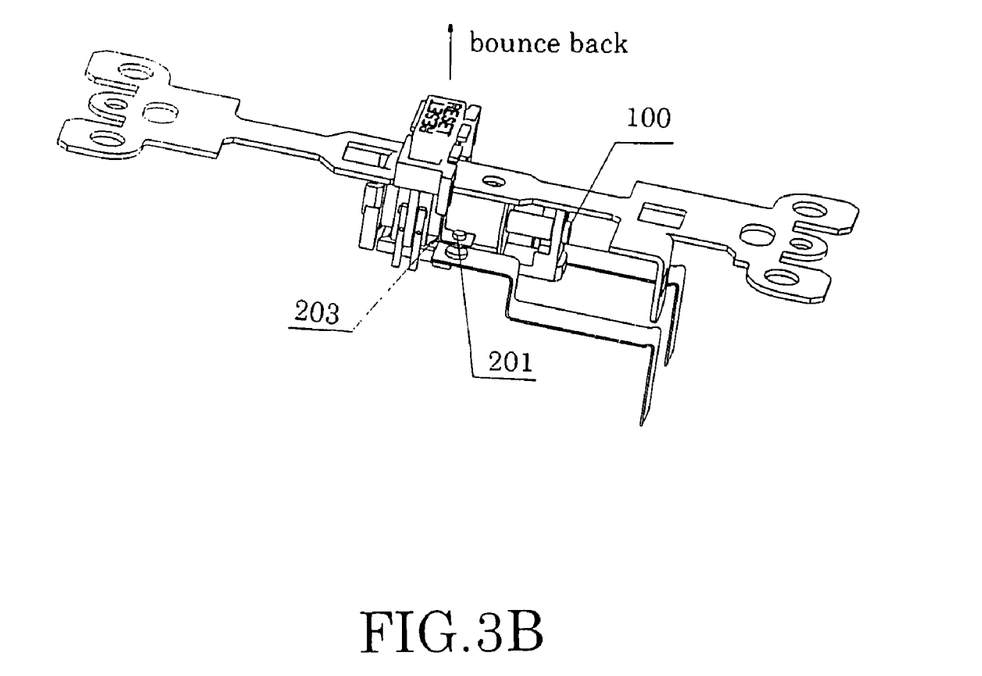

FIG. 3 illustrates the operation of the trip breaker cutting off the electrical connection between the power supply and the load, as the hot wire is short to the ground. As the fault current occurs between the hot wire and the ground, the driver coil of the first module 1 inducts the fault current as an induction current and incorporates with a capacitor 1 having a potential difference to form a signal extraction circuit. Accordingly, the induction current is amplified by the third module 3 and is sent to the first I/O port of the fourth module 4. The fourth module 4 will compare the electric potential at the first I/O port with a preset value. If the electric potential at the first I/O port is larger than the preset value, the fourth module 4 will set the gate of a first switch at a relative high level through a second I/O port. Once the control switch is activated, the second coil of the trip breaker is electrified to drive the armature 100 by electromagnetic force to move. Accordingly, the armature 100 moves from the first position, as shown in FIG. 3A, to the second position as shown in FIG. 3B. Correspondingly, the locking device 203 moves from the first position as shown in FIG. 3A to the second position as shown in FIG. 3B. The movable terminal 201 1 is in contact with the fixed terminal 202 as shown in FIG. 3A and is driven to move away from the fixed terminal 202 through the supporting frame 204 as shown in FIG. 3B. The electrical connection between the power supply and the load is cut off once the movable terminal 201 is moved away from the fixed terminal 202 under a fault circuit condition.

Figure 4A:
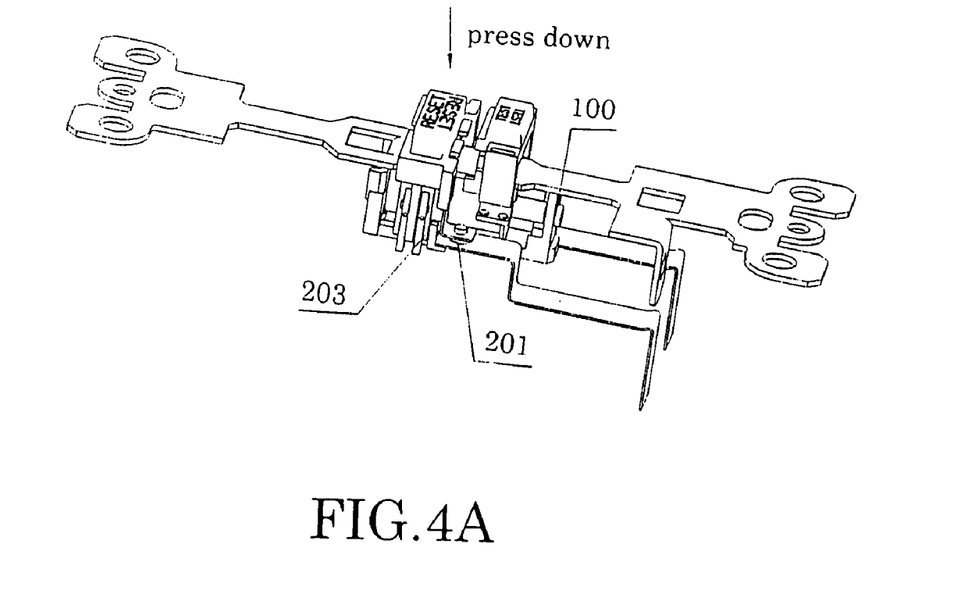
FIGS. 4A and 4B illustrate the trip breaker cutting off the electrical connection between the load and the power supply when neutral wire is short to the ground and the fault current exceeds preset threshold.
Figure 4B:
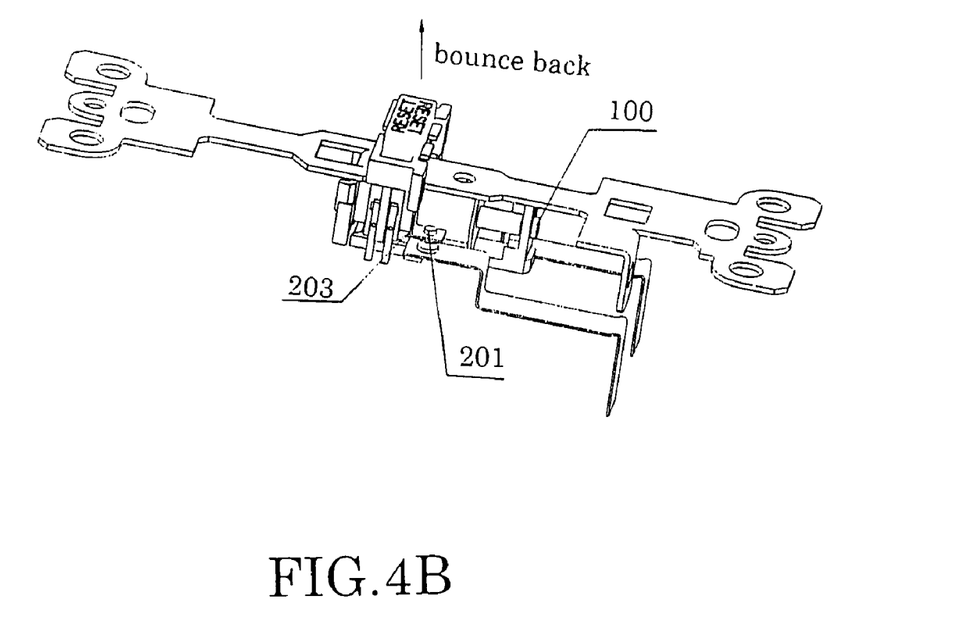

FIG. 4 illustrates the operation of the trip breaker cutting off the electrical connection between the power supply and the load, as the neutral wire is short circuit to the ground and the fault current exceeds the preset threshold. As the fault current occurs between the neutral wire at the load side and the ground, the driver coil of the first module 1 inducts the fault current as an induction current and superposes a fault current on a full-wave rectified signal by electromagnetic induction. In other words, the fault current passes through the driver coil of the first module 1 to obtain an induction current by electromagnetic induction. By incorporating with a capacitor 1 having a potential difference, a signal extraction circuit is formed. The induction current is amplified by the third module 3 and is sent to the first I/O port of the fourth module 4. The fourth module 4 will compare the electric potential at the first I/O port with a preset value. If the electric potential at the first I/O port is larger than the preset value, the fourth module 4 will set the gate of a first switch at a relative high level through a second I/O port. Once the two-way control switch is conducted to electrify the second coil of the trip breaker, the second coil will drive the armature 100 by electromagnetic force to actuate the locking device 203. Accordingly, the armature 100 moves from a first position as shown in FIG. 4A to a second position as shown in FIG. 4B. Correspondingly, the locking device 203 moves from a first position as shown in FIG. 4A to a second position as shown in FIG. 4B. The movable terminal 201 1 is in contact with the fixed terminal 202 as shown in FIG. 4A and is driven to move away from the fixed terminal 202 through the supporting frame 204 as shown in FIG. 4B. The electrical connection between the power supply and the load is cut off once the movable terminal 201 is moved away from the fixed terminal 202 under a fault circuit condition.

Figure 5A:
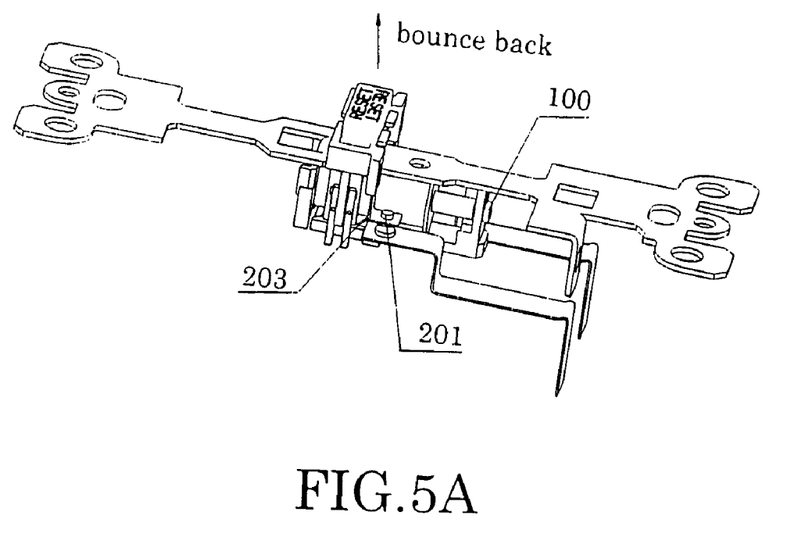
FIGS. 5A and 5B illustrate the trip breaker prohibiting the electrical connection between the load and the power supply when the wires are misconnected.
Figure 5B:
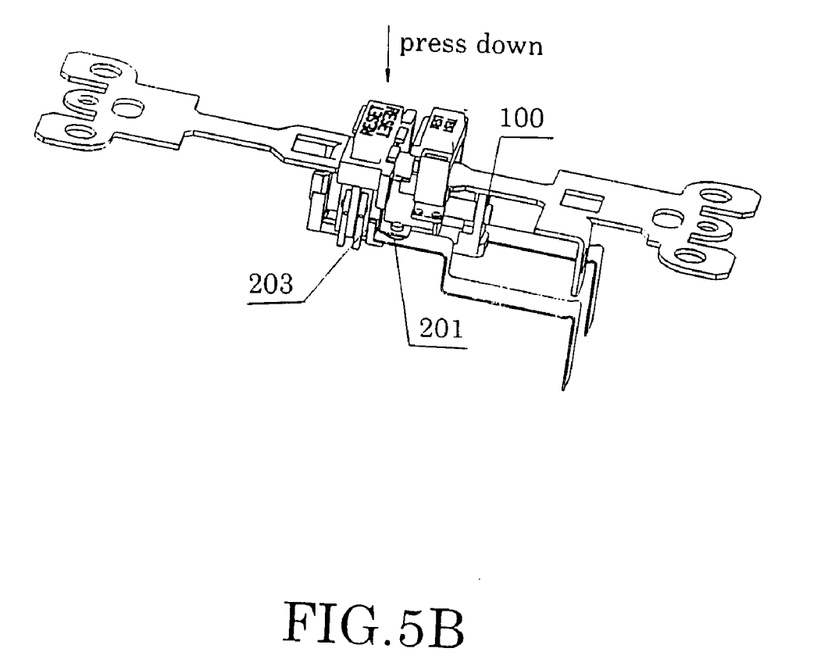

FIG. 5 illustrates the operation of the trip breaker prohibiting the re-connection between the load and the power supply even though resetting the trip breaker by the reset button 301, as the wires are misconnected, i.e. the hot wire is connected with the neutral wire. When the wires are misconnected, a two-way control switch tube and a transient voltage suppressor are connected between the neutral wire and ground wire in series connection. Accordingly, the electric potential between the neutral wire and the ground wire is relatively high to conduct the transient voltage suppressor, wherein a relatively high magnitude of fault current will flows through the neutral wire. Then, when the fault current passes through the driver coil, the driver coil inducts the sensor coil by electromagnetic force to obtain an induction current. By incorporating with a capacitor 1 having a potential difference, a signal extraction circuit is formed. The induction current is amplified by the third module 3 and is sent to the first I/O port of the fourth module 4. The fourth module 4 will compare the electric potential at the first I/O port with a preset value. If the electric potential at the first I/O port is larger than the preset value, the fourth module 4 will set the gate of a first switch at a relative low level through a second I/O port. Once the two-way control switch is not conducted, the first coil cannot be electrified. Therefore, the armature 100 cannot be pushed to press at the locking device 203 to actuate the locking device 203. In other words, the armature 100 cannot be moved from a first position as shown in FIG. 5A to a second position as shown in FIG. 5B. Correspondingly, the locking device 203 cannot be moved from a first position as shown in FIG. 5A to a second position as shown in FIG. 5B. Therefore, the movable terminal 201 1 cannot be driven by the supporting frame 204 to contact with the fixed terminal 202 that the movable terminal 201 cannot be moved from a first position as shown in FIG. 5A to a second position as shown in FIG. 5B. The electrical connection between the power supply and the load is cut off once the movable terminal 201 is moved away from the fixed terminal 202 under a fault circuit condition. Thus, even though the trip breaker is reset by the reset button 301, the movable terminal 201 cannot be moved to contact with the fixed terminal 202 to keep the load from electrically disconnecting with the power supply. In other words, the load cannot be electrically connected to the power supply unless the problem of wire misconnection is fixed.

Figure 6:
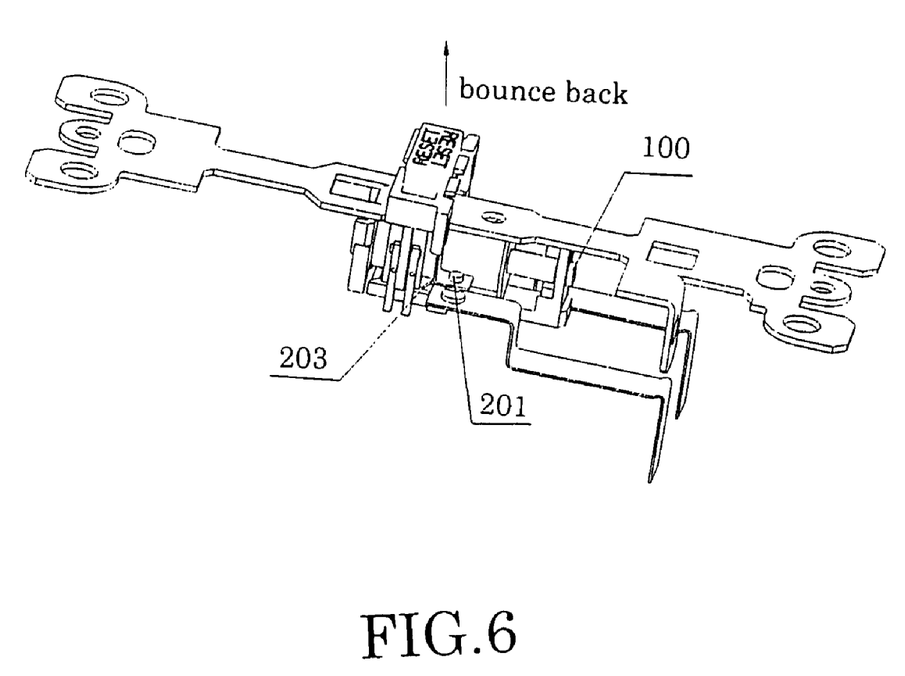
FIG. 6 illustrates the trip breaker prohibiting the electrical connection between the load and the power supply when the wires are reversely connected.

FIG. 6 illustrates the operation of the trip breaker prohibiting the re-connection between the load and the power supply even though the trip breaker is reset by the reset button 301, as the wires are reversely connected. Since the supply of the power of the trip breaker device is from the load side, the first coil of the trip breaker cannot be electrified when the wires are reversely connected. Therefore, the armature 100 cannot be pushed to press at the locking device 203 to actuate the locking device 203. In other words, the movable terminal 201 cannot be contacted with the fixed terminal 202 to electrically connect the load with the power supply. Even though the trip breaker is reset by the reset button 301, the movable terminal 201 cannot be moved to contact with the fixed terminal 202 to keep the load from electrically disconnecting with the power supply As illustrated above, the present invention can automatically cut off the power supply of the hot wire and neutral wire to the load as ground fault circuit interrupter, when the hot wire or neutral wire is grounded with fault. The two LED indicators indicate that whether the circuit is electrified and whether the ground fault circuit interrupter is interrupted or operating. In the present invention, the power supply and the load cannot be electrically connected when the wire is misconnected or reversely connected in an improper manner. The present invention, based on the programmable integrated module, can automatically cut off the power supply of the hot wire and neutral wire to the load, can perform the function of self-check, and can indicates whether the ground fault circuit interrupter is interrupted.

Figure 7:
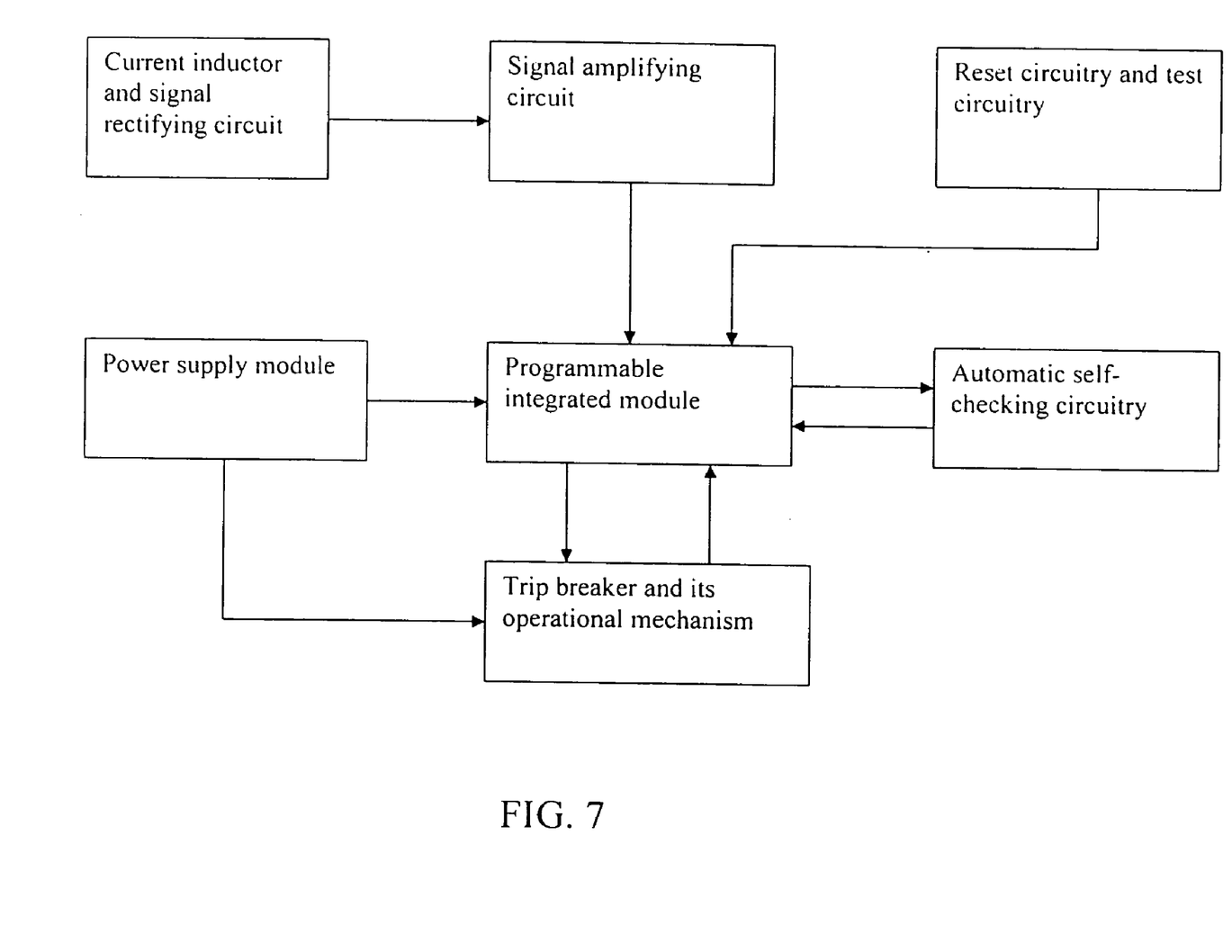
FIG. 7 is a block diagram illustrating the structural configuration of a ground fault circuit interrupter according to the above preferred embodiment of the present invention.
Figure 8:
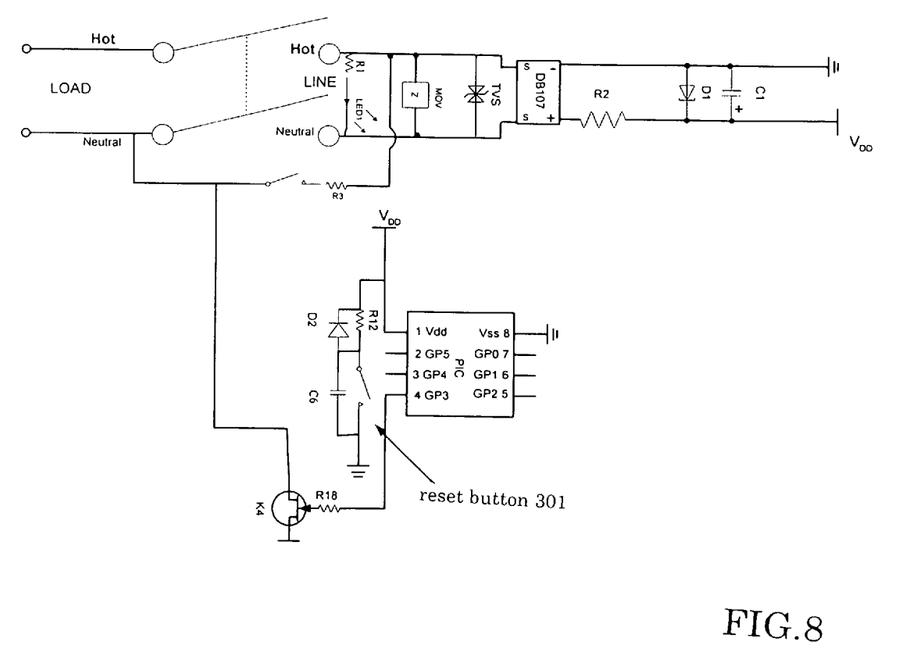
FIG. 8 is a circuit diagram illustrating the electrical configuration of the programmable integrated module according to the above preferred embodiment of the present invention.
Figure 9:
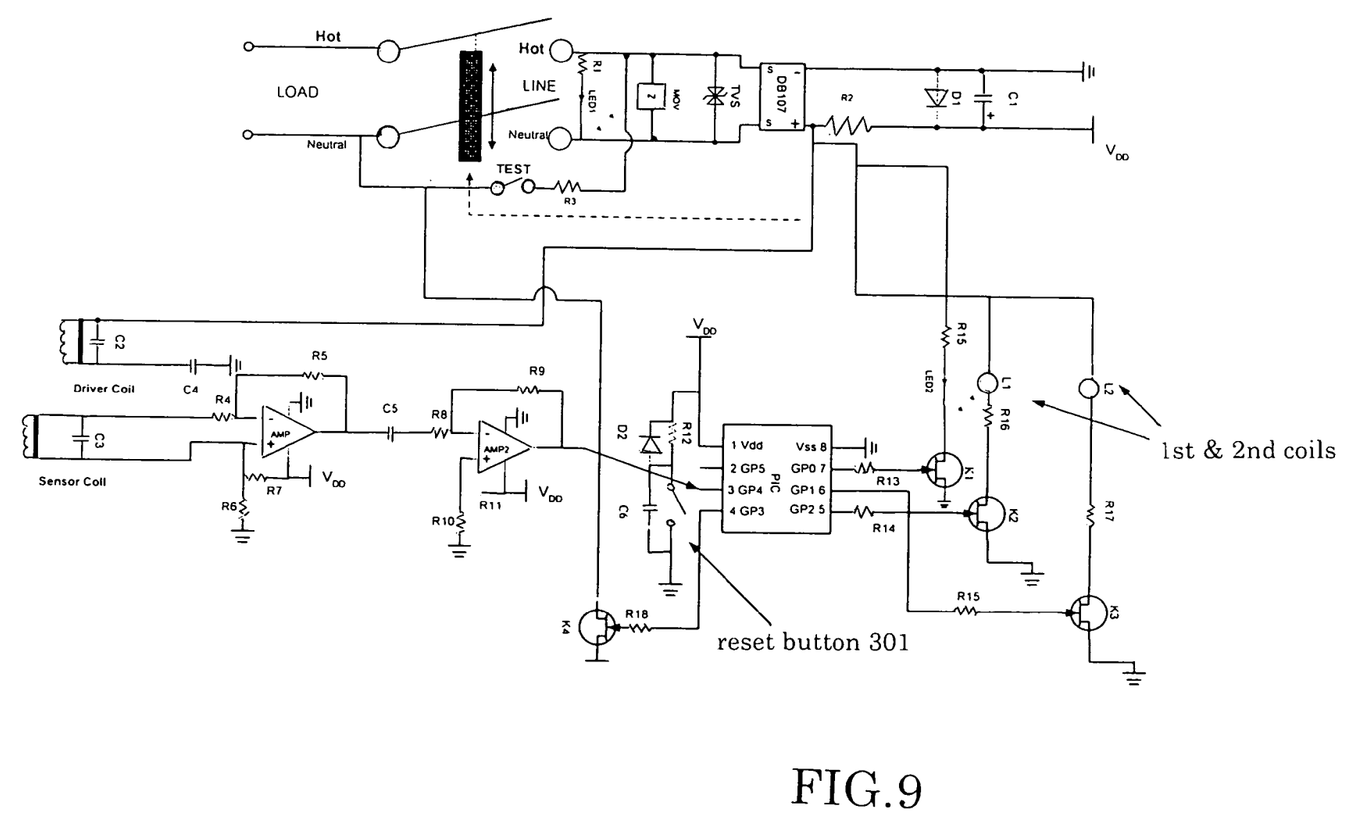
FIG. 9 is a circuit diagram illustrating the electrical configuration of the ground fault circuit interrupter according to the above preferred embodiment of the present invention.

Referring to FIG. 7 of the drawings, the ground fault circuit interrupter is generally constructed by seven modules, wherein the electrical configurations of the programmable integrated module and the ground fault circuit interrupter are illustrated in FIGS. 8 and 9 respectively.

The first module 1 is a power supply module, wherein the first module 1 comprises a bridge silicon rectifier stack, a filter capacity, a stabilivolt circuit. Accordingly, the first module 1 is adapted to provide and rectify +5 V power supply for the programmable integrated module. The power supply module, which is small in size, ensures the efficiency of the power supply in a stable manner.

The second module 2 is an induction device and a signal rectifying circuit, wherein the second module 2 comprises two zero-phase current inductors, which are a sensor coil and a driver coil, and a capacitor set. One of the current inductors has a coil ratio of primary and secondary windings being set as 1:1000 while another current inductor has a coil ratio of primary and secondary windings being set as 1:200. Each of the zero-phase current inductors incorporates with the iron core made of ring microcrystalline material to minimize the tolerance deviation of the angular measurement.

The third module 3 is a signal amplifying circuit, which comprises four operational amplifiers by using unipolar +power supply. One of the operational amplifiers incorporates with an emitter follower to ensure the impedance matching between the inductor and the following amplifiers. Another two operational amplifiers are used for cascade amplification. Accordingly, each of the operational amplifiers has a gain of 24 dB such that the total gain of the two operational amplifiers is 48 dB.

The fourth module 4 is a programmable integrated module which incorporates with a 8-bit programmable integrated module from Microchip Company, wherein the electrical configuration of the programmable integrated module is shown in FIG. 8. When the ground fault circuit interrupter is connected to the power supply, a LED indicator is electrified to generate an illuminating operation signal to indicate the operation of the ground fault circuit interrupter. Therefore, the programmable integrated module will perform a self-checking operation. During the self-checking operation, the I/O port of the LED indicator, which is also used as an indicator for End-of-life indication, and the I/O port of the reset button 301 are set at a relatively low electrical level. If the reset button 301 is actuated after the self-checking operation is completed, the I/O port of the reset button 301 is set at a relatively high electrical level. The programmable integrated module sets the I/O port of the control switch at the gate at a relatively high level. Accordingly, when the control switch is conducted, the loop of the trip breaker is closed to drive the movable terminal 201 contacting with the fixed terminal 202 so as to electrically connect the load with the power supply. Then, the programmable integrated module will periodically inquire the inquiring signal from the sensor coil through the third module 3, wherein the inquiring time of the programmable integrated module is about 1 ms. Accordingly, the inquiring signal will be compared with a preset value. When the value of the inquiring signal is larger than the preset value, the gate of the programmable integrated module at the I/O port will set the control switch at a high level such that the control switch is conducted to electrify the second coil of the trip breaker. Therefore, the movable terminal 201 is moved away from the fixed terminal 202 to cut off the electrical connection between the load and the power supply. When the value of the inquiring signal is smaller than the preset value, the programmable integrated module will perform the End-of-life self-checking operation. Once the self-checking operation is completed, the programmable integrated module will keep determining the operation current through the sensor coil. If the operation current does not exceed the preset value, the programmable integrated module will repeatedly monitor the operation current and perform the self-checking operation.

The fifth module 5 comprises an automatic self-checking circuitry to perform the automatic self-checking operation. Regarding to the UL requirement, the ground fault circuit interrupter requires checking the fault of the neutral wire connection. A 1 ohm resistor is electrically connected between the neutral wire and the ground wire in a series connection, wherein the trip breaker checks whether there is a fault current between the neutral wire and the ground wire when the operation current passes through the 1 ohm resistor. Accordingly, the control switch, having a breakdown voltage between source and drain above 60V, and has an on-resistance smaller than 0.1 ohm, is electrically coupled between the neutral wire and the ground wire in a series connection. Thus, a resistor is electrically coupled between the source and the ground wire in a series connection to ensure the series resistance smaller than 1 ohm between the neutral wire and the ground wire when the source and drain conducts. The gate of the control switch is set at a relatively high level at a time interval of one minute through an I/O portion of the programmable integrated module of the fourth module 4 to conduct the control switch. An induction current is inducted at the secondary winding of the sensor coil by electrically coupling the driver coil with the sensor coil by electromagnetic force. The induction current is amplified by the third module 3 and is sent to the fourth module 4. Then, the fourth module 4 will compare the induction current with a preset threshold. When the value of the induction current is the same as the preset threshold, the first to fourth modules 1-4, are operating normally. The I/O port of the fourth module 4 for indicating the End-of-life is set at a relatively low level, wherein the LED indicator will generate a slow-twinkling signal at a frequency of 10 seconds. When the value of the induction current is larger than the preset threshold, the I/O port of the fourth module 4 is set at a relatively low level while the LED indicator will generate a fast-twinkling signal at a frequency of 1 second. Meanwhile, the programmable integrated module sets the gate of the control switch of the second coil of the trip breaker at a high level to conduct the control switch tube. Once the control switch is conducted, the trip breaker cuts off the electrical connection between the power supply and the load. If the control switch or the trip breaker is malfunctioned, the electrical connection between the load and the power supply cannot be cut off. However, the LED indicator will generate the fast-twinkling signal to indicate the life of the ground fault circuit interrupter is terminated. A transient voltage suppressor is electrically coupled to the source and drain of the control switch in a parallel connection, wherein the transient voltage suppressor, having a 60V breakdown voltage, is arranged to protect the control switch from being broken down due to the high electric potential difference between the neutral wire and the ground wire.

On the other hand, when the neutral wire and hot wire are improperly connected, the breakdown voltage of the transient voltage suppressor 60V is far lower than the voltage between the neutral wire and hot wire. Therefore, the transient voltage suppressor is conducted to protect the control switch. At the same time, a large residual current is produced between the neutral wire and hot wire. Accordingly, the large residual current is obtained by the second module 2 to cut off the electrical connection between the load and the power supply via the fourth module 4 and the sixth module 6. Unless the electrical connection between the neutral wire and the hot wire is properly connected, the first coil of the trip breaker cannot be inducted even though the reset button 301 is actuated. In other words, the armature 100 will not be driven to move such that the locking device 203 cannot be actuated to electrically re-connect the load with the power supply.

The sixth module 6 illustrates the mechanism of the trip breaker, wherein the sixth module 6 comprises the control switch, the trip breaker, the movable terminal 201, and the fixed terminal 202. The control switch is operatively controlled by the fourth module 4. When the fault current is larger than the preset threshold, the switch control is conducted to electrify the second coil of the trip breaker. Therefore, the armature 100 is driven to move the locking device 203 so as to move the movable terminal 201 away from the fixed terminal 202 via the resilient spring force. In other words, the electrical connection between the load and the power supply is cut off.

The seventh module 7 illustrates the accessories of the trip breaker and their functions, wherein the seventh module 7 comprises a reset circuitry with the reset button 301 and a test circuitry with the test button 302. Accordingly, when the reset button 301 is actuated by a pressing force, a reset signal is sent to the fourth module 4 so as to set the I/O port of the fourth module 4 at a relatively high level. Accordingly, the fourth module 4 is arranged to monitor the status of the reset button 301 when the reset button 301 is actuated. After the fourth module 4 checks the actuation of the reset button 301, the control switch of the sixth module 6 is triggered at a relatively high electric potential to induct the first coil of the trip breaker. The armature 100 is actuated by the first coil through the electromagnetic force to actuate the locking device 203. Once the locking device 203 is actuated, the movable terminal 201 is moved away from the fixed terminal 202 by the resilient spring force so as to cut off the electrical connection between the load and the power supply. Accordingly, the circuitry of the test button 302 is electrically coupled with the hot wire and the neutral wire of the load, wherein a 22K resistor is electrically coupled with the circuitry of the test button 302 in series connection. When the primary winding of the sensor coil of the second module 2 produces a 6 mA current, the current is amplified through the third module 3 and is compared through the fourth module 4. Then, a trigger signal is produced to the seventh module 7 to conduct the switch control. Once the switch control is conducted to electrify the second coil of the trip breaker, the armature 100 is actuated to actuate the locking device 203. Once the locking device 203 is actuated, the movable terminal 201 is moved away from the fixed terminal 202 by the resilient spring force so as to cut off the electrical connection between the load and the power supply.

As illustrated above, the present invention can automatically cut off the power supply of the hot wire and neutral wire to the load as ground fault circuit interrupter when the hot wire or neutral wire is grounded with fault. The two LED indicators indicate that whether the circuitry of the ground fault circuit interrupter is electrified and whether the ground fault circuit interrupter is interrupted or operating. In the present invention, the power supply and the load cannot be re-connected when the wire is misconnected and improperly connected.

The present invention, bases on the programmable integrated module, can automatically cut off the power supply of the hot wire and neutral wire to the load, has the function of self-check, and can indicates whether the ground fault circuit interrupter is interrupted.

What is claimed is:

1. A ground fault circuit interrupter for preventing an overload current from a power supply to a load, comprising:
   a first module supplying a unipolar =power supply;
   a second module obtaining a fault current in responsive to a hot wire and a neutral wire with a ground wire;
   a third module amplifying a signal of said fault current from said second module;
   a fourth module which comprises a programmable control module for determining said fault current, wherein when said programmable control module presets a preset threshold for said fault current to be compared;
   a fifth module comprising an End-of-life circuitry performing an automatic self-checking operation;
   a sixth module which comprises a control switch, a trip breaker, an armature, a locking device, a movable terminal, and a fixed terminal, wherein when said fault current is larger than said preset threshold, said programmable control module sends a control signal to said control switch such that said control switch electrifies a second coil of said trip breaker to drive an armature to actuate said locking device, so as to move said movable terminal away from said fixed terminal for electrically disconnecting said load with said power supply; and
   a seventh module comprising a reset circuitry for resetting said trip breaker and a test circuitry for checking a status of said trip breaker.

2. The ground fault circuit interrupter, as recited in claim 1, wherein said test circuitry of said seventh module comprises a LED indicator producing an illuminating signal to indicate said status of said ground fault circuit interrupter, wherein when said fault current is not larger than said preset threshold that said ground fault circuit interrupter is normally operated, a slow-twinkling signal is generated, and when said fault current is larger than said preset threshold that said ground fault circuit interrupter is abnormally operated, a fast-twinkling signal is generated.

3. The ground fault circuit interrupter, as recited in claim 1, wherein said fifth module comprises a transient voltage suppressor electrically coupling with said control switch, wherein when said wires are misconnected, said control switch and said transient voltage suppressor are connected between said neutral wire and said ground wire in series connection such that an electric potential between said neutral wire and said ground wire is relatively high to conduct said transient voltage suppressor, wherein said control switch is then electrified to separate said movable terminal with said fixed terminal for electrically disconnecting said load with said power supply so as to prohibit said ground fault circuit interrupter from being reset to re-connect said load with said power supply unless said hot wire and said neutral wire are connected properly.

4. The ground fault circuit interrupter, as recited in claim 2, wherein said fifth module comprises a transient voltage suppressor electrically coupling with said control switch, wherein when said wires are misconnected, said control switch and said transient voltage suppressor are connected between said neutral wire and said ground wire in series connection such that an electric potential between said neutral wire and said ground wire is relatively high to conduct said transient voltage suppressor, wherein said control switch is then electrified to separate said movable terminal with said fixed terminal for electrically disconnecting said load with said power supply so as to prohibit said ground fault circuit interrupter from being reset to re-connect said load with said power supply unless said hot wire and said neutral wire are connected properly.

5. The ground fault circuit interrupter, as recited in claim 1, wherein a first coil of said trip breaker is not electrified to drive said armature to actuate said locking device when said neutral wire and said hot wire are reversely connected, so as to prohibit said ground fault circuit interrupter from being reset to re-connect said load with said power supply unless said hot wire and said neutral wire are connected properly.

6. The ground fault circuit interrupter as recited in claim 4, wherein a first coil of said trip breaker is not electrified to drive said armature to actuate said locking device when said neutral wire and said hot wire are reversely connected, so as to prohibit said ground fault circuit interrupter from being reset to re-connect said load with said power supply unless said hot wire and said neutral wire are connected properly.

7. The ground fault circuit interrupter, as recited in claim 1, wherein said second module comprises two zero-phase current inductors for obtaining said fault current from said hot wire to said ground wire and from said neutral wire to said ground wire, wherein one of said current inductors has a coil ratio of primary and secondary windings being set as 1:1000 while another said current inductor has a coil ratio of primary and secondary windings being set as 1:200.

8. The ground fault circuit interrupter, as recited in claim 6, wherein said second module comprises two zero-phase current inductors for obtaining said fault current from said hot wire to said ground wire and from said neutral wire to said ground wire, wherein one of said current inductors has a coil ratio of primary and secondary windings being set as 1:1000 while another said current inductor has a coil ratio of primary and secondary windings being set as 1:200.

9. A method of preventing an overload current from a power supply to a load through a ground fault circuit interrupter, comprising the steps of:
   (a) obtaining an interrupted fault current from a hot wire to a ground wire via a first zero-phase current inductor and a fault current from a neutral wire to the ground wire via a second zero-phase current inductor;

(b) amplifying a signal of said fault current by an Op-Amp; and (c) determining said fault current by a programmable control module, wherein when said fault current is larger than a preset threshold, said programmable control module sends a control signal to a control switch such that said control switch electrifies a second coil of a trip breaker to drive an armature at an unlocked position, so as to separate a movable terminal with a fixed terminal for electrically disconnecting said load with said power supply;

(d) determining said hot wire and said neutral wire are connected improperly by determining whether said hot-wire and said neutral wire are reversely connected, wherein when said hot wire and said neutral wire are reversely connected, a first coil of said trip breaker is not electrified to actuate said armature; and (e) prohibiting said ground fault circuit interrupter from being reset to re-connect said load with said power supply unless said hot wire and said neutral wire are connected properly.

10. The method, as recited in claim 9, wherein said step (e) comprises a step of keeping said movable terminal away from said fixed terminal to prohibit a re-connection between said load and said power supply when said ground fault circuit interrupter is reset.

11. A method of preventing an overload current from a power supply to a load through a ground fault circuit interrupter, comprising the steps of:

(1) obtaining an interrupted fault current from a hot wire to a ground wire via a first zero-phase current inductor and a fault current from a neutral wire to the ground wire via a second zero-phase current inductor;

(2) amplifying a signal of said fault current by an Op-Amp;

(3) determining said fault current by a programmable control module, wherein when said fault current is larger than a preset threshold, said programmable control module sends a control signal to a control switch such that said control switch electrifies a second coil of a trip breaker to drive an armature at an unlocked position, so as to separate a movable terminal with a fixed terminal for electrically disconnecting said load with said power supply;

(4) performing an automatic self-checking operation to determine a status of said ground fault circuit interrupter in responsive to said fault current whether in a normal operation; and (5) producing an illuminating signal to indicate said status of said ground fault circuit interrupter in condition that: when said fault current is not larger than said preset threshold that said ground fault circuit interrupter is normally operated, a slow-twinkling signal is generated; and when said fault current is larger than said preset threshold that said ground fault circuit interrupter is abnormally operated, a fast-twinkling signal is generated.

12. The method, as recited in claim 11, further comprising the step (3.1), in between said step (3) and said step (4), of determining said hot wire and said neutral wire are connected improperly; and step (3.2) of prohibiting said ground fault circuit interrupter from being reset to re-connect said load with said power supply unless said hot wire and said neutral wire are connected properly.

13. The method, as recited in claim 12, wherein the step (3.1) further comprises the steps of: (3.1.1) obtaining a magnitude of said fault current will flowing through said neutral wire, wherein said hot wire and said neutral wire are electrically misconnected when said magnitude of said fault current is relatively high; and (3.1.2) electrifying said control switch to separate said movable terminal with said fixed terminal for electrically disconnecting said load with said power supply.

14. The method, as recited in claim 12, wherein said step (3.1) further comprises a step of determining whether said hot wire and said neutral wire are reversely connected, wherein when said hot wire and said neutral wire are reversely connected, a first coil of said trip breaker is not electrified to actuate said armature.

15. The method, as recited in claim 13, wherein said step (3.2) comprises a step of keeping said movable terminal away from said fixed terminal to prohibit a re-connection between said load and said power supply when said ground fault circuit interrupter is reset.

16. The method, as recited in claim 14, wherein said step (3.2) comprises a step of keeping said movable terminal away from said fixed terminal to prohibit a re-connection between said load and said power supply when said ground fault circuit interrupter is reset.

* * * * *